E. R. DRAKE.
METHOD FOR PROTECTING GROWING PLANTS AND VEGETABLES.
APPLICATION FILED MAR. 1, 1909.
932,971.  Patented Aug. 31, 1909.
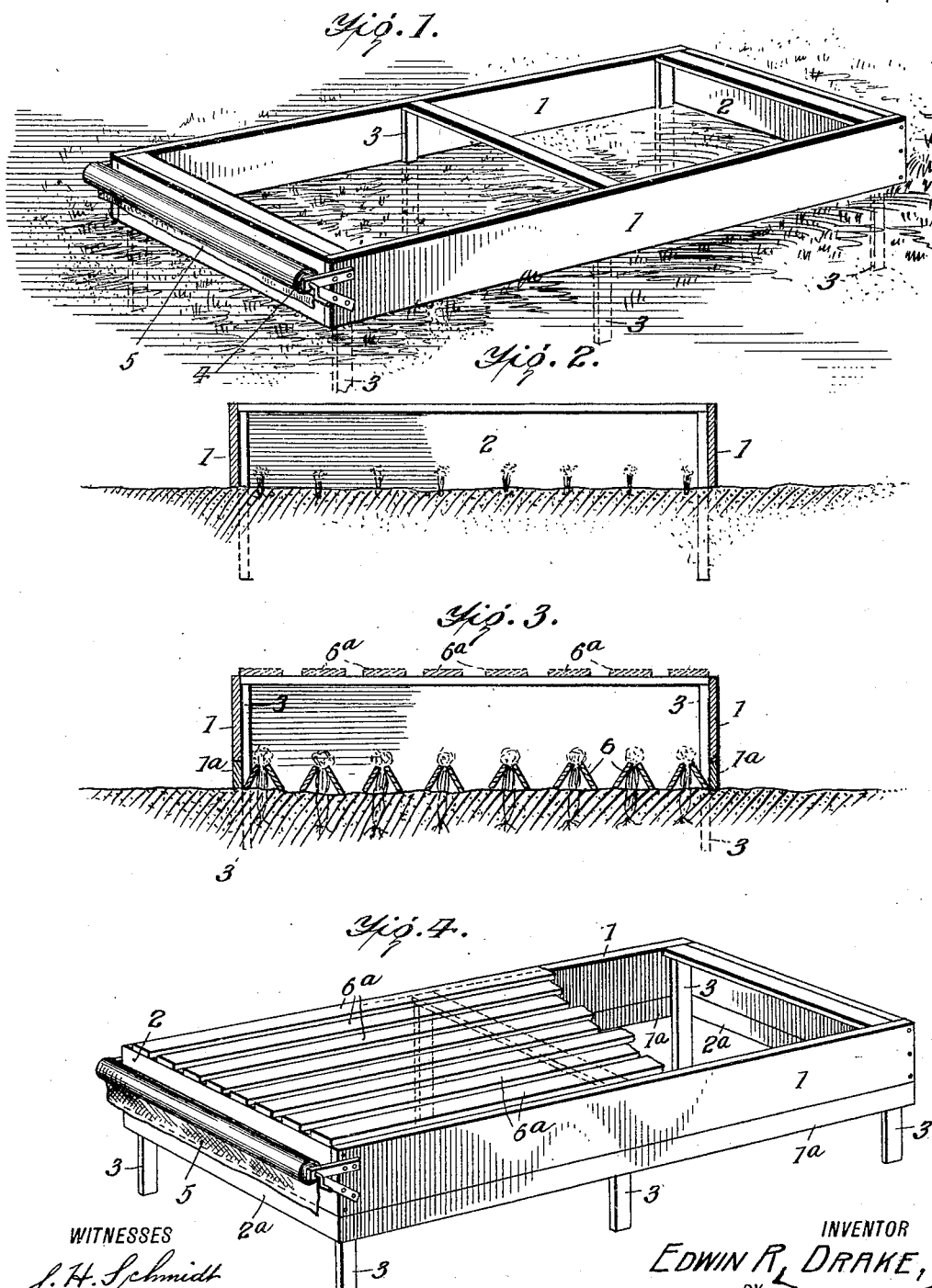

UNITED STATES PATENT OFFICE.

EDWIN R. DRAKE, OF DE LAND, FLORIDA.

METHOD FOR PROTECTING GROWING PLANTS AND VEGETABLES.

932,971.  Specification of Letters Patent.  Patented Aug. 31, 1909.

Application filed March 1, 1909. Serial No. 480,701.

*To all whom it may concern:*

Be it known that I, EDWIN R. DRAKE, a citizen of the United States, residing at De Land, in the county of Volusia, State of Florida, have invented an Improved Method for Protecting Growing Plants and Vegetables, of which the following is a specification.

The apparatus which I employ, in part, in carrying out my method, is an improvement upon the plant-protector for which I have obtained Letters-Patent No. 898,341, dated September 8, 1908. Such plant-protector consists of a frame inclosed on two sides and provided with vertical posts of a length adapted to enter the soil. I have changed the construction of the apparatus in important particulars, and I employ an improved method of cultivating plants, especially such as celery, lettuce, and tomatoes, in which my improved apparatus is a necessary element.

The details of the invention are as hereinafter described, with reference to the accompanying drawing, in which—

Figure 1 is a perspective view of the apparatus in its primary form. Fig. 2 is a cross section of the same. Fig. 3 is a cross-section illustrating a certain step in the method and change in the construction of the apparatus requisite for carrying out the same. Fig. 4 is a perspective view of the apparatus in its complete form.

The box-like frame which I employ is composed of vertical side and end boards 1 and 2, attached to the vertical corner and side posts 3, which are made of such length that they are adapted to enter the soil a considerable depth. At one end of the frame there is arranged a roller 4, upon which is wound a flexible cover 5, preferably burlap, which may be drawn off the roller and extended over the frame when necessary to protect the plants from frost or intense rays of the sun.

In my previous invention, the frame was open on two sides, but it will be noted that in this case it is inclosed on all sides, so that the plants are fully protected from the cold and hot weather.

When vegetables such as celery, have grown above the soil, to a height of twelve (12) inches, the entire frame composed of parts 1, 2, 3, is raised about four inches, and additional boards 1ª and 2ª are attached to the posts 3 below the original side and end portions 1 and 2 as represented in Fig. 3. Then, as the next step in the method, when the celery is about sixteen inches high, boards 6 about five feet long eight inches wide and one-fourth of an inch thick are placed interiorly of the frame one on each side of a row of celery. Thus the frame complete in respect to sides and ends, presents the appearance shown in Fig. 4. It will be seen that the legs 3 are of sufficient length to duly support the frame when raised as described.

The celery, or other vegetable, is planted out in rows about twelve inches apart that are parallel to the sides 1, 1ª, of the frame, and at the proper stage in the growth of the vegetables, or whenever the heat of the sun is such as to require it, boards 6ª are laid on the frame parallel to the sides 1, and to each other, but separated by about three inches of space. Eight boards 6, are laid over the plants as shown in Fig. 3. It will be seen that the aggregate width of the boards 6ª is considerably less than the width of the frame, so that when duly adjusted the required space is left between them. By practical experience, I have found that this method of protection is particularly efficacious where the heat of the sun is great, as in the southern portion of the United States. It will be seen, however, that the sun is not totally excluded from access to the plants or the earth in which they are embedded, since the sun's rays pass between the boards and thus, in the course of the day, shine directly upon all the plants but no portion is subjected to the rays of the sun for a long time. By opposite boards between each two rows of celery and the over boards the bodies are bleached as desired, while the tops take on a brilliant green. In brief, by this method, I am able to produce celery having a highly bleached body and green top and possessing unrivaled tenderness, crispness, and flavor.

I claim:

The improved method of growing plants consisting, first, in protecting the plant-bed on its several sides, but leaving the same open and exposed above; next, when the plants have grown to a considerable height, raising the protecting parts correspondingly, and also shading the plants along the sides and overhead, as described.

EDWIN R. DRAKE.

Witnesses:
ISAAC A. STEWART,
MARY STEWART.